United States Patent [19]
Smith et al.

[11] Patent Number: 5,121,209
[45] Date of Patent: Jun. 9, 1992

[54] SHARPNESS CONTROL FOR A TELEVISION IMAGE

[75] Inventors: Terrence R. Smith, Westmont; Michael A. Isnardi, Plainsboro, both of N.J.

[73] Assignee: RCA Licensing Corporation, Princeton, N.J.

[21] Appl. No.: 590,760

[22] Filed: Oct. 1, 1990

[51] Int. Cl.⁵ .......................................... H04N 5/208
[52] U.S. Cl. ..................................... 358/166; 358/162
[58] Field of Search ................. 358/166, 37, 180, 13, 358/11, 140, 141, 12, 162

[56] References Cited

U.S. PATENT DOCUMENTS

| | | | |
|---|---|---|---|
| 4,090,217 | 5/1978 | Goyal et al. | 358/166 |
| 4,399,460 | 8/1983 | Harwood et al. | 358/166 |
| 4,402,006 | 8/1983 | Karlock | 358/162 |
| 4,538,578 | 8/1985 | Bolger | 358/166 |
| 4,623,913 | 11/1986 | Fling et al. | 358/37 |
| 4,698,673 | 10/1987 | Johnson | 358/37 |
| 4,783,840 | 11/1988 | Song | 358/166 |
| 4,816,899 | 3/1989 | Strolle et al. | 358/12 |
| 4,862,271 | 8/1989 | Smith et al. | 358/166 |
| 4,963,958 | 10/1990 | Sendelweck | 358/37 |
| 5,047,856 | 9/1991 | Miller | 358/166 |
| 5,055,916 | 10/1991 | Dieterich | 358/12 |

*Primary Examiner*—James J. Groody
*Assistant Examiner*—Jeffrey S. Murrell
*Attorney, Agent, or Firm*—Joseph S. Tripoli; Eric P. Herrmann; Ronald H. Kurdyla

[57] ABSTRACT

A video signal processing system includes a signal interpolator associated with time compression/expansion apparatus. The interpolator is preceded by a high frequency peaking network which responds to a variable control signal representative of a desired amount of displayed image sharpness. In a disclosed embodiment the peaking network responds to a control signal which is a function of a distance between image pixels, and a variable signal from a viewer adjustable image sharpness control.

5 Claims, 5 Drawing Sheets

SHARPNESS CONTROL FOR A TELEVISION IMAGE

FIELD OF THE INVENTION

This invention concerns apparatus for enhancing the sharpness of an image displayed by a television receiver.

BACKGROUND OF THE INVENTION

It is desirable in a television receiver to provide a mechanism for controlling the sharpness of a displayed image. Such a mechanism can operate automatically, or manually under the control of a viewer. The sharpness of a displayed image can be subjectively improved or enhanced by increasing the slope or steepness of video signal amplitude transitions. Such enhancement, sometimes referred to as signal peaking, is typically associated with the high frequency information of the video signal. For example, horizontal image peaking can be achieved by generating a signal "preshoot" immediately before an amplitude transition, and a signal "overshoot" immediately after an amplitude transition, so that black-to-white and white-to-black video signal amplitude transitions are accentuated. A video sharpness control system with both manual and automatic operating modes is described in U.S. Pat. No. 4,399,460—Harwood et al., for example.

Some television receiver systems, particularly those employing digital signal processing of video information, include one or more interpolar networks for various purposes, such as in association with time compression and expansion functions, for example. One such system is disclosed in U.S. Pat. No. 4,816,899—Strolle et al. In the system shown in this patent, a signal peaking network precedes an interpolator in a time expansion/compression network to compensate for high frequency attenuation caused by a low pass filtering effect which is commonly associated with the interpolation function. The amount of peaking is a function of a distance between image pixels (picture elements) subjected to interpolation, and restores a desired high frequency response which had been compromised by the low pass filtering effect of the interpolation process.

SUMMARY OF THE INVENTION

It is herein recognized that the combination of an interpolator and associated peaking network, as discussed, can advantageously be employed to additionally control the sharpness of a displayed image either automatically in response to a video signal condition such as noise content, or manually in response to the setting of a viewer adjustable sharpness control. In accordance with the principles of the present invention a video signal peaking network associated with a video signal interpolator responds to a variable control signal representative of a desired amount of displayed image sharpness. In accordance with a feature of the invention, the peaking network provides a variable amount of peaking in response to both the sharpness control signal and a signal representative of a distance between image pixels.

DETAILED DESCRIPTION OF THE DRAWING

Figure 1:
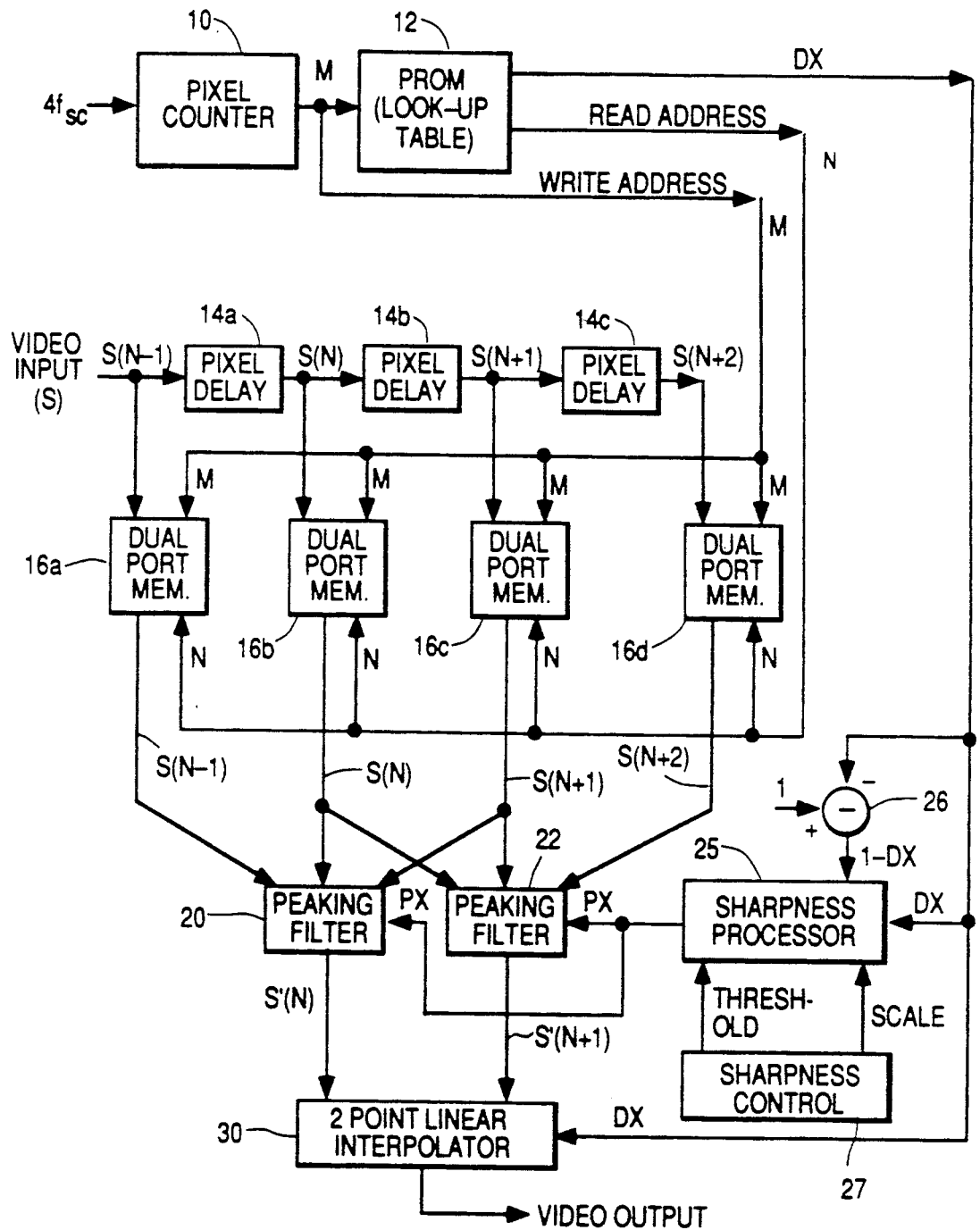
FIG. 1 shows video signal time compressor/expander apparatus including an interpolator, peaking network and image sharpness control network arranged in accordance with the present invention.
Figure 2:
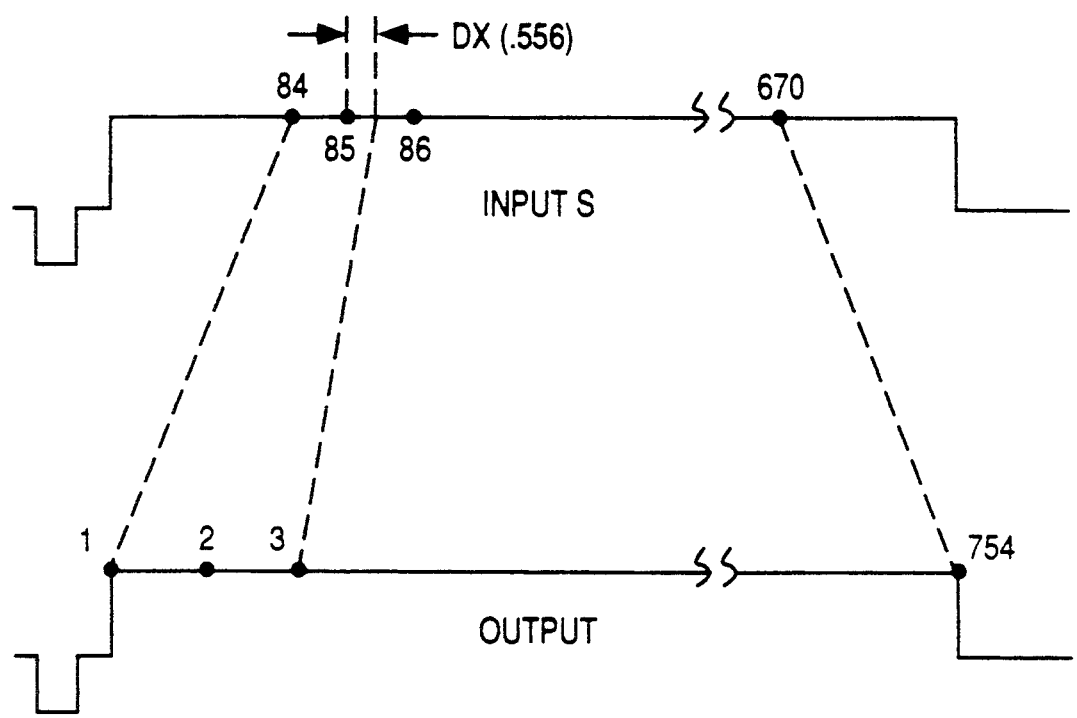
FIG. 2 is a diagram illustrating a video signal time expansion operation.

FIG. 1 illustrates so-called raster mapper apparatus which can be used for time expanding or time compressing a video input signal S. In this example signal S is a widescreen television signal, having a main (center) panel component and left and right side panel components, e.g., as disclosed in U.S. Pat. No. 4,816,899—Strolle et al. The mapping process is illustrated by FIG. 2. The upper waveform of FIG. 2 shows input signal S with a center panel portion between pixels 84 and 670 which is intended to be mapped into pixel locations 1–754 of an output signal waveform by means of a time expansion process. End point pixels 84 and 670 of waveform S map directly into end point pixels 1 and 754 of the output waveform. Intermediate pixels do not map directly on a 1:1 basis due to the time expansion, and in many cases do not map on an integer basis. The latter case is illustrated when, for example, pixel location 85.556 of input waveform S corresponds to integer pixel location 3 of the output waveform. Thus pixel location 85.556 of signal S contains an integer part (85) and fractional part DX (0.556), and pixel location 3 of the output waveform contains an integer part (3) and a fractional part (0). DX represents the fractional distance between a calculated input pixel position and the next lower existing pixel position.

In FIG. 1, a pixel counter 10 operating at a 4×fsc rate, where fsc is the frequency of a chrominance subcarrier (approx. 3.58 MHz according to NTSC standards), provides an output WRITE ADDRESS signal M representative of pixel locations (1...754) on an output raster. Signal M is applied to a PROM (Programmable Read Only Memory) 12 which includes a look-up table containing programmed values depending upon the nature of raster mapping to be performed, e.g., time compression or time expansion. In response to signal M, PROM 12 provides an output READ ADDRESS signal N representing an integer number, and an output signal DX representing a fractional number equal to or greater than zero but less than unity. In practice, DX is quantized to a finite number of bits. If DX is quantized to six bits for example, it can represent fractional parts 0, 1/64, 2/64, 3/64 ... 63/64.

PROM 12 permits expansion or compression of input signal S as a function of stored values of signal N. Thus a programmed value of READ ADDRESS signal N and a programmed value of fractional part signal DX are provided in response to integer values of pixel location signal M. To achieve signal expansion, for example, PROM 12 produces signal N at a rate slower than that of signal M. Conversely, to achieve signal compression, PROM 12 provides signal N at a rate greater than that of signal M.

Video input signal S is delayed by cascaded pixel delay elements 14a, 14b and 14c to produce video signals S(N+2), S(N+1) and S(N) which are mutually delayed versions of the video input signal. These signals are applied to video signal inputs of respective dual port memories 16a-16d, as are known. Signal M is applied to a write address input of each of memories 16a-16d, and signal N is applied to a read address input of each of memories 16a-16d. Signal M determines where incoming video signal information will be written into the memories, and signal N determines which values be read out of the memories. The memories can write into one address while simultaneously reading out of another address. Output signals S(N−1), S(N), S(N−1) and S(N+2) from memories 16a-16d exhibit a time expanded or time compressed format depending upon the read/write operation of memories 16a-16d, which is a function of how PROM 12 is programmed.

Figure 6:
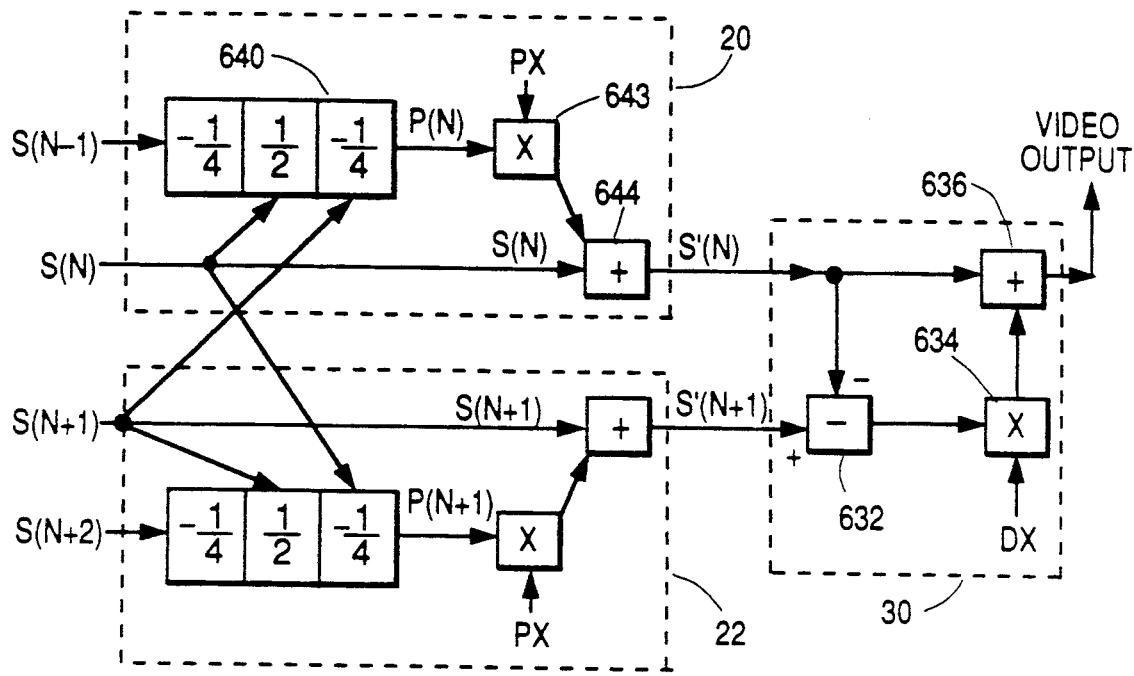
FIGS. 6 and 7 show additional details of portions of the apparatus of FIG. 1.
Figure 7:
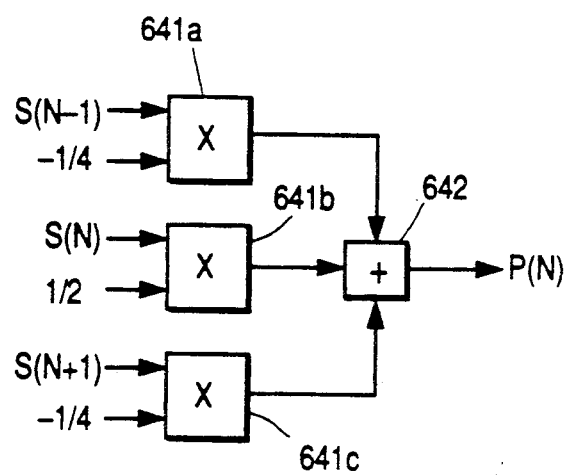

Signals S(N−1), S(N), S(N+1) and S(N+2) from memories 16a-16d are processed by a linear interpolation technique comprising peaking filters 20 and 22 and a two-point linear interpolator 30, details of which are shown in FIGS. 6 and 7. Peaking filters 20 and 22 receive three signals from the group of signals including signals S(N−1), S(N), S(N+1) and S(N+2), as shown, as well as receiving a peaking signal PX. The value of PX determines the amount of high frequency information added to signals S(N) and S(N+1) to form signals S'(N) and S'(N+1).

Peaking signal PX is provided by a sharpness processor 25, and exhibits a value which is a function of the values of signal DX, signal 1−DX from a subtracter 26, and sharpness control signals THRESHOLD and SCALE from a sharpness control unit 27 which may be manually or automatically adjustable. Units 25 and 27 will be discussed in greater detail in connection with FIGS. 3 and 4.

Peaking filters 20 and 22 respectively provide peaked (i.e., controllably high frequency enhanced) mutually delayed video signals S'(N) and S'(N+1) to two-point linear interpolator 30, which also receives signal DX. Interpolator 30 provides a compressed or expanded video output signal which is defined by the expression Video Output = S'(N) + DX[S'(N+1) − S'(N)]

When DX equals zero, the video output is S'(N). When DX approaches unity, the video output approaches S'(N+1). The described interpolator and peaking function advantageously approximates a first negative lobe of a (sin X)/X interpolation function with good resolution of high frequency detail. Interpolator 30 exhibits a low pass filter characteristic which may be compensated by having filters 20 and 22 pass an appropriate amount of high frequency information to produce a flat frequency response at the output of interpolator 30. The output signal from interpolator 30 also may exhibit a relatively peaked or depeaked high frequency response to produce a desired amount of image sharpness, depending upon the value of signal PX, as will be discussed.

FIG. 6 shows details of peaking filters 20 and 22, and interpolator 30. In FIG. 6 signals S(N+1), S(N) and S(N+1) are supplied to a weighting circuit 640 which comprises a high pass filter in peaking filter 20, where these signals are respectively weighted by peaking coefficients $-\frac{1}{4}$, $\frac{1}{2}$ and $-\frac{1}{4}$. As shown in FIG. 7, high pass filter 640 comprises multipliers 641a-641c for respectively multiplying signals S(N−1), S(N) and S(N+1) with peaking coefficients $-\frac{1}{4}$, $\frac{1}{2}$ and $-\frac{1}{4}$. Output signals from multipliers 641a-641c are summed in an adder 642 to produce a high passed signal P(N), which is multiplied by signal PX in multiplier 643 to produce a peaking signal. Adder 644 combines the peaking signal from the output of multiplier 643, with center tap signal S(N) of the high pass filter. If PX=0, no peaking is peformed and signals S(N) and S(N+1) are passed directly to interpolator 30. Peaking filter 22 exhibits similar structure and operation.

In two point interpolator 30, signal S'(N) is subtracted from signal S'(N+1) in a subtractor 632 to produce a difference signal which is multiplied by signal DX in a multiplier 634. The output signal from multiplier 634 is summed with signal S'(N) in an adder 636 to produce the video output signal.

Figure 3:
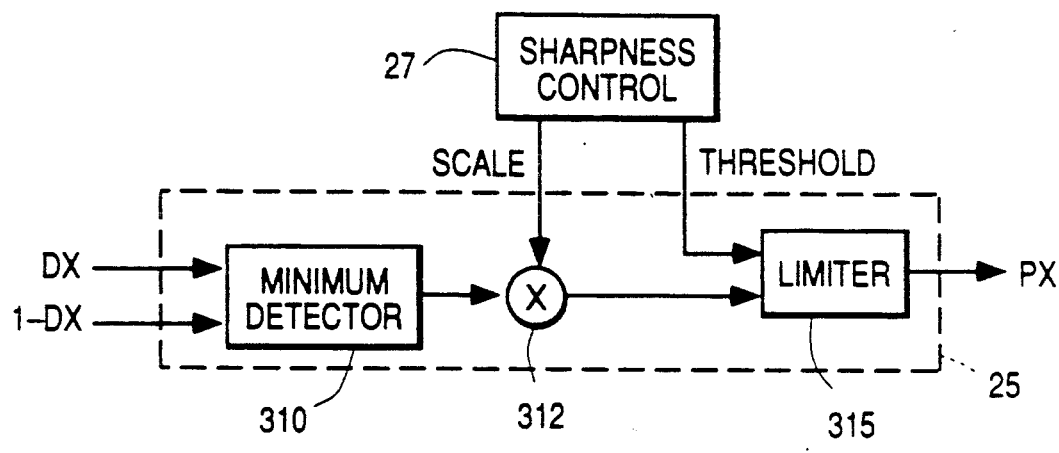
FIG. 3 shows details of a sharpness control signal processor used in the apparatus of FIG. 1.

Sharpness processor 25, a digital signal processor, is shown in greater detail in FIG. 3. The variable SCALE and THRESHOLD signals from control 27 are in binary form. The variable SCALE signal value determines the magnitude of the peaking (or depeaking) associated with signal PX as a function of distance value DX, and the variable THRESHOLD signal value determines a limit on the amount of peaking provided, as will be seen from FIG. 4. Control 27 may include digital circuits alone, or a combination of analog and digital circuits such as viewer adjustable potentiometers followed by an analog-to-digital converter for providing variable SCALE and THRESHOLD digital signals to processor 25.

Processor 25 includes a minimum detector 310 responsive to signal DX and its additive inverse, 1−DX, for producing an output signal which is multiplied by the SCALE signal in a multiplier 312. Minimum detector 310 insures that PX exhibits a symmetrical response around the 0.5 midpoint value of DX, by selecting as an output the smaller of the values of DX and 1−DX. An adaptive limiter 315, which may be realized as a minimum detector, responds to the output signal from multiplier 312 and to the THRESHOLD signal for producing signal PX. Limiter 315 insures that the value of PX does not exceed a given maximum value determined by the magnitude of the THRESHOLD signal.

Figure 4:
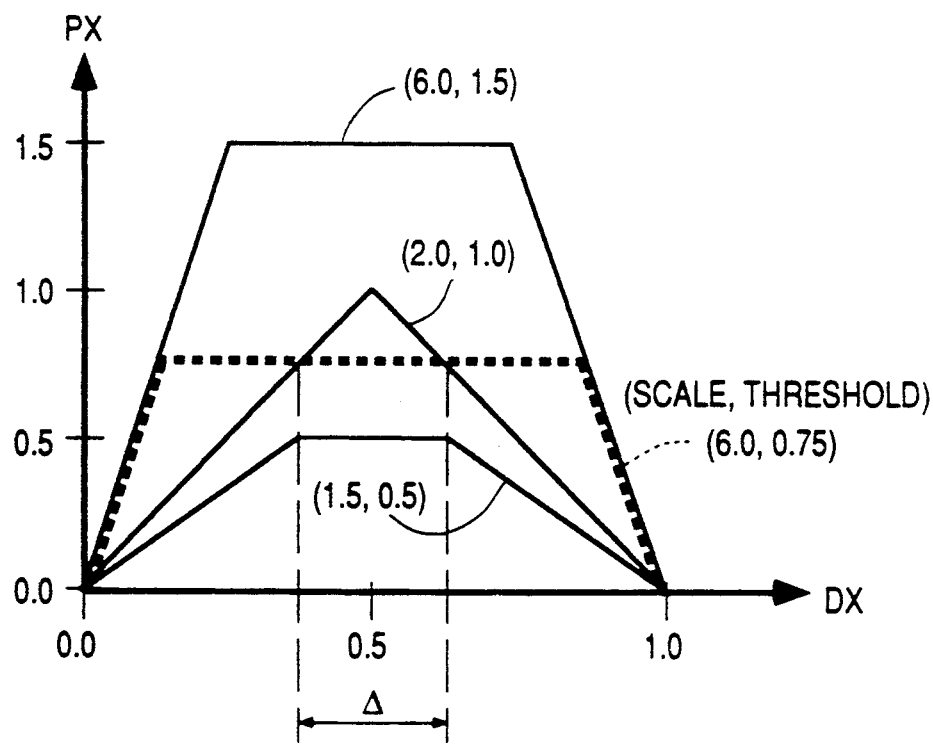
FIG. 4 illustrates variable response characteristics of sharpness control apparatus according to the present invention.

FIG. 4 illustrates four responses for signal PX as a function of DX and as a function of the variable values of the SCALE and THRESHOLD signals. Other responses also are possible. A triangular-shaped response designated by SCALE and THRESHOLD values of 2.0 and 1.0 respectively, i.e., (2.0, 1.0), produces a flat frequency response at the output of linear interpolator 30 in FIG. 1. The amount of high frequency attenuation due to the interpolation produced by interpolator 30 is a linear function of the position of an interpolated sample relative to the two associated actual samples, with a minimum at each pixel (DX=0.0 and 1.0) and a maximum at the midpoint between pixels (DX=0.5). Thus, to produce a flat frequency response this peaking response (2.0, 1.0) produces linearly increasing peaking from DX=0.0 to DX=0.5 at which maximum peaking is produced, and linearly decreasing peaking from DX=0.5 to DX=1.0.

The lowermost trapezoidal-shaped response, designated as (1.5, 0.5), produces a depeaked response at the output of interpolator 30, since the values of PX produced between DX=0 and DX=1.0 are less than those of the previous example (2.0, 1.0) which produced a flat frequency response at the output of interpolator 30.

The uppermost, trapezoidal-shaped response (6.0, 1.5) produces a peaked or enhanced high frequency response at the output of interpolator 30 for all values of DX between 0.0 and 1.0. In this case the values of PX exceed the values of PX needed to produce a flat response for all values of DX between 0.0 and 1.0, as can be seen by comparing these values with those of the first example (2.0, 1.0). The remaining smaller trapezoidal-shaped response (6.0, 0.75), shown with a dotted outline, provides more peaking overall than the response in the first example, except for a region Δ centered around DX=0.5 where depeaking relative to the first and last examples occurs.

Thus it is seen that the THRESHOLD sharpness control value limits the amount of peaking or depeaking gain, i.e., above and below a nominal value of PX at which a flat frequency response is produced at the output of interpolator 30. The SCALE sharpness control value alters the gain characteristic of the PX versus DX response along the vertical axis, and thus controls the amount of peaking or depeaking provided, subject to the limits imposed by the THRESHOLD value. The described horizontal peaking control is employed in conjunction with a horizontal interpolator 30. Analogous vertical peaking control apparatus can be employed in conjunction with a vertical interpolator.

Figure 5:
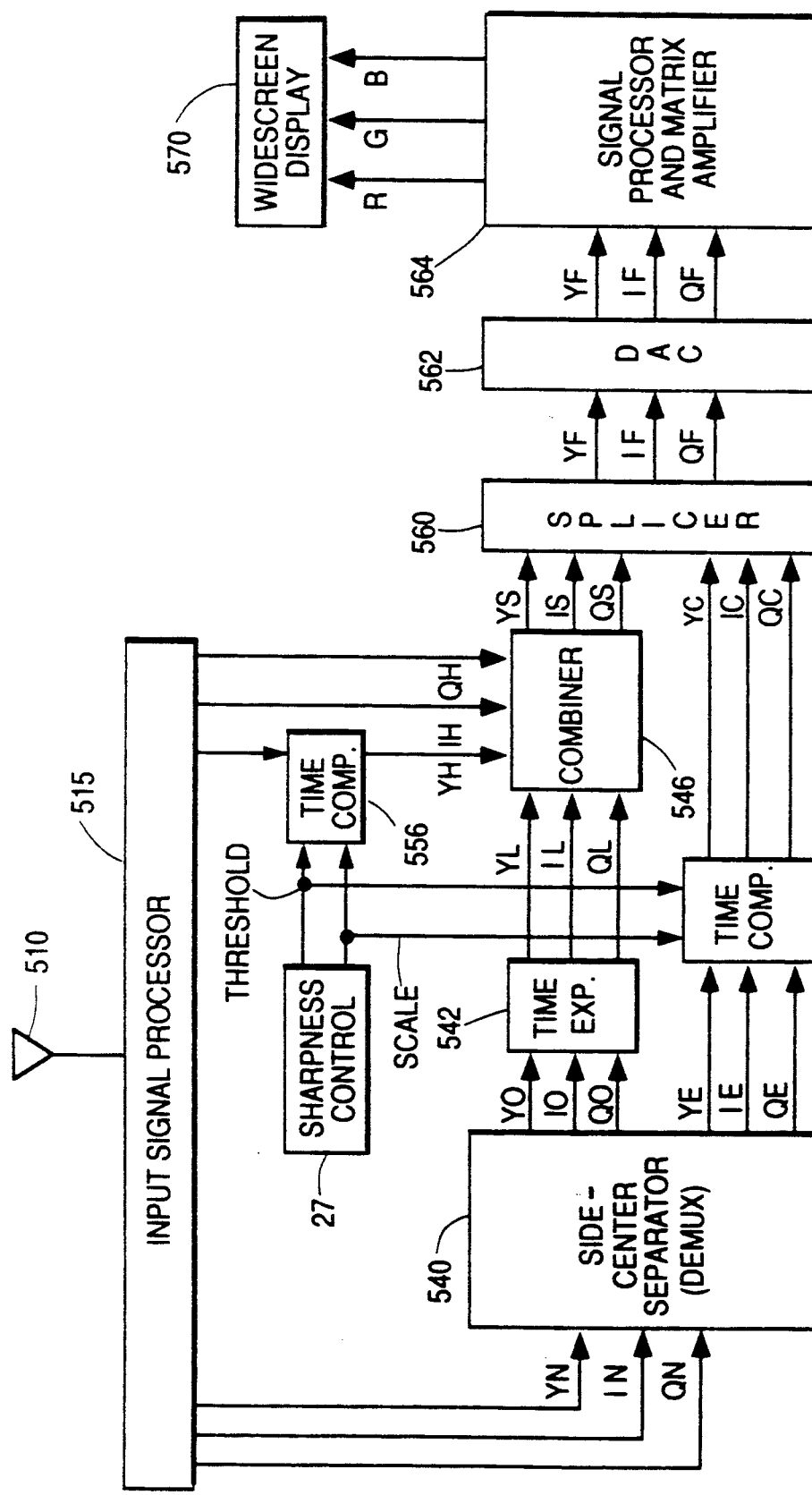
FIG. 5 is a block diagram of a portion of a television receiver including sharpness control apparatus according to the present invention.

FIG. 5 illustrates a portion of a widescreen television receiver system including sharpness control apparatus of the type discussed in connection with FIGS. 1-4. The system of FIG. 5, except for unit 27 and certain aspects of time compressors 556 and 554, is described in detail in U.S. Pat. No. 4,816,899—Strolle et al. Briefly, an encoded widescreen television signal is received by an antenna 510 and applied to an input signal processor 515 of a widescreen receiver. The encoded signal contains time compressed low frequency side panel information disposed in horizontal overscan regions, and time expanded high frequency side panel information modulating an auxiliary subcarrier at a baseband frequency. Processor 515 includes RF and IF circuits, demodulators, analog to digital converter networks, and filter networks for producing baseband signals, YN, IN and QN which contain luminance (Y) and chrominance (I, Q) center panel information and low frequency side panel information, and baseband signals YH, IH and QH containing luminance and chrominance high frequency side panel information.

Signals YN, IN and QN are separated into compressed side panel lows YO, IO, QO and expanded center panel signals YE, IE, QE by means of a side-center panel signal separator (time de-multiplexer) 540. Signals YO, IO and QO are time expanded by means of a time expander 542 to restore the original spatial relationship of the side panel lows in the widescreen signal, as represented by restored side panel lows signals YL, IL and QL. Similarly, to make room for the side panels, signals YE, IE and QE are time compressed by means of a time compressor 544 to restore the original spatial relationship of the center panel signal in the widescreen signal, as represented by restored center panel signals YC, IC and QC. Time compressor 544 includes apparatus of the type shown in FIG. 1 for responding to SCALE and THRESHOLD signals from a sharpness control 27. The restored side panels lows YL, IL and QL are combined in a combiner 546 with restored side panel highs YH, IH and QH from processor 515.

Recovered high frequency side panel luminance signal YH is time compressed by a unit 556 before being applied to unit 546. Time compressor 556 includes apparatus of the type shown in FIG. 1 for responding to SCALE and THRESHOLD signals from sharpness control 27. Compressor 556 "maps" the left and right compressed side highs signals into proper position within each horizontal scanning line, thereby producing spatially restored side panel high signal YH.

Spatially restored side panel highs YH. IH and QH are combined with spatially restored side panel lows YL, IL and QL by combiner 546 to produce reconstructed side panel signals YS, IS and QS. These signals are spliced to reconstructed center panel signals YC, IC and QC by means of a splicer 560 to form a fully reconstructed widescreen luminance signal YF and fully reconstructed widescreen color difference signals IF and QF.

Widescreen signals YF, IF and QF are converted to analog form by means of a digital-to-analog converter 562 before being applied to a video signal processor and matrix amplifier unit 564. The video signal processor component of unit 654 includes signal amplifying DC level shifting, brightness control, contrast control and video signal processing circuits of a conventional nature. Matrix amplifier 564 combines luminance signal YF with color difference signals IF and QF to produce color image representative video signals R, G and B. These color signals are amplified by display driver amplifiers in unit 564 to a level suitable for directly driving a widescreen color image display device 570, e.g., a widescreen kinescope.

What is claimed is:

1. In a system for processing a video signal containing picture element image information to be displayed. apparatus for modifying the high frequency response of said video signal comprising:

a video signal interpolator having an input and an output and disposed in a path conveying said video signal;

a peaking processor disposed in said video signal path for modifying the high frequency reponse of a video output signal from said interpolator;

an image sharpness processor for generating a variable sharpness control signal including a sharpness control first component independent of distance between pixels and a second components representative of a distance between pixels; and means for applying said sharpness control signal to said peaking processor for controlling the operation thereof to variably modify said high frequency response so that said high frequency response varies as a function of both said first and second components.

2. Apparatus according to claim 1, wherein said sharpness processor includes a manual sharpness control device operable by a viewer of a displayed image.

3. Apparatus according to claim 1, wherein said distance representative second component exhibits a value between zero and unity.

4. Apparatus according to claim 1, wherein said video signal with a modified high freqency response exhibits a maximum response over a plurality of points, including the midpoint, between pixels.

5. Apparatus according to claim 1, wherein said sharpness processor includes a detector responsive to a first signal DX representative of a fractional distance between a calculated input pixel position and the next lower existing pixel position, and to a second signal defined by the expression 1−DX, for providing an output representative of the smaller value of signals DX and 1−DX;

a sharpness control network for generating a first sharpness control signal representative of a sharpness gain characteristic, and a second sharpness control signal for limiting said gain characteristic;

a signal multiplier responsive to said first sharpness control signal and to an output signal from said detector; and a limiter responsive to an output signal from said multiplier and to said second sharpness control signal.

* * * * *